(12) United States Patent
Iizuka (10) Patent No.: US 8,921,752 B2
(45) Date of Patent: Dec. 30, 2014

(54) INFORMATION ACQUISITION DEVICE, INFORMATION ACQUISITION METHOD, RECORDING MEDIUM, AND INFORMATION ACQUISITION SYSTEM

(71) Applicant: Casio Computer Co., Ltd., Tokyo (JP)

(72) Inventor: Nobuo Iizuka, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 218 days.

(21) Appl. No.: 13/630,845

(22) Filed: Sep. 28, 2012

(65) Prior Publication Data

US 2013/0082167 A1   Apr. 4, 2013

(30) Foreign Application Priority Data

Sep. 29, 2011   (JP) .................. 2011-215700

(51) Int. Cl.
  *G01J 1/44*  (2006.01)
  *G06T 7/00*  (2006.01)
(52) U.S. Cl.
  CPC ..... *G06T 7/0042* (2013.01); *G06T 2207/30252* (2013.01)
  USPC .................... 250/206.1; 250/214.1
(58) Field of Classification Search
  USPC ............. 250/208.1, 206.1–206.3, 214.1
  See application file for complete search history.

(56) References Cited

U.S. PATENT DOCUMENTS 5,500,525 A * 3/1996 Saban ........................ 250/221

FOREIGN PATENT DOCUMENTS

| JP | 2002-178283 A | 6/2002 |
| JP | 2005-063184 A | 3/2005 |
| JP | 2009-118178 A | 5/2009 |
| JP | 2011-134058 A | 7/2011 |

OTHER PUBLICATIONS

Japanese Office Action dated Mar. 26, 2013 (and English translation thereof) in counterpart Japanese Application No. 2011-215700.
Chinese Office Action dated Sep. 11, 2014, issued in counterpart Chinese Application No. 201210374407.1.
Xue Songshi et al, "Industrial Enterprise Communication (Comprehensive)"; Posts & Telecom Press, 1984, p. 66.
Zhao Zisen, "Optical Fiber Communication Engineering"; 1987, p. 488.
Wang Qiming et al, "Photoelectron Technology Supporting Technology of Information Age", 2002, p. 95.

* cited by examiner

*Primary Examiner* — Tony Ko
(74) *Attorney, Agent, or Firm* — Holtz, Holtz, Goodman & Chick PC (57) ABSTRACT

Moving-objects movable in a workspace, each includes an imaging unit with a two-dimensional light receiving surface; and a decoding processing unit. If light received by an imaging surface of the imaging unit is brightness-modulated information, the decoding processing unit decodes the received light to the information. If the information decoded by the decoding processing unit contains spatial position information of moving-objects other than a self-moving-object, the self-moving-object receives the light from light sources, has the decoding processing unit decode the light to acquire pieces of position information of the other moving-objects, thereby acquiring position information of the self-moving-object in the workspace from these pieces of position information.

10 Claims, 9 Drawing Sheets

| TIME | 100A | 100B | 100C | 100D | 100E |
|---|---|---|---|---|---|
| t0 | UNIDENTIFIED | UNIDENTIFIED | UNIDENTIFIED | UNIDENTIFIED | UNIDENTIFIED |
| t1 | ABSOLUTE POSITION IDENTIFIED | ABSOLUTE POSITION IDENTIFIED | ABSOLUTE POSITION IDENTIFIED | RELATIVE POSITION IDENTIFIED | RELATIVE POSITION IDENTIFIED |
| t2 | ABSOLUTE POSITION IDENTIFIED | ABSOLUTE POSITION IDENTIFIED | ABSOLUTE POSITION IDENTIFIED | ABSOLUTE POSITION IDENTIFIED | RELATIVE POSITION IDENTIFIED |
| t3 | ABSOLUTE POSITION IDENTIFIED | ABSOLUTE POSITION IDENTIFIED | ABSOLUTE POSITION IDENTIFIED | ABSOLUTE POSITION IDENTIFIED | ABSOLUTE POSITION IDENTIFIED |

FIG.14

| TIME | 100A | 100B | 100C |
|---|---|---|---|
| t0 | ABSOLUTE POSITION IDENTIFIED | ABSOLUTE POSITION IDENTIFIED | UNIDENTIFIED |
| t1 | ABSOLUTE POSITION IDENTIFIED | ABSOLUTE POSITION IDENTIFIED | RELATIVE POSITION IDENTIFIED |
| t2 | ABSOLUTE POSITION IDENTIFIED | ABSOLUTE POSITION IDENTIFIED | ABSOLUTE POSITION IDENTIFIED |

INFORMATION ACQUISITION DEVICE, INFORMATION ACQUISITION METHOD, RECORDING MEDIUM, AND INFORMATION ACQUISITION SYSTEM

CROSS-REFERENCE TO RELATED APPLICATION

This application claims the benefit of Japanese Patent Application No. 2011-215700, filed Sep. 29, 2011, the entire disclosure of which is incorporated by reference herein.

FIELD

This application relates to an information acquisition device, an information acquisition method, a recording medium and an information acquisition system.

BACKGROUND

There is a system capable of individually recognizing each of objects in a space.

For example, Unexamined Japanese Patent Application Kokai Publication No. 2009-118178 describes as follows.

In a situation where a large number of objects freely move on a floor in a building, a receiver (camera) to perform image sensor communication is disposed on a place with a good view such as a ceiling, and each of the objects emits light modulated according to ID of the object, by as a light emitting diode (LED) or the like.

The receiver receives light emitted from a device to be measured to recognize existence of each ID, thereby a positional relationship between the objects, each being differentiated by each ID.

In such a system, if the objects are, for example, self-propelled moving-objects, it is possible for any one of the objects to see and recognize positions of other objects.

SUMMARY

The present invention was made in view of such a problem, and the objective of the present invention is that assuming that a movable object is a node and in a space where a plurality of such nodes exists, recognition of position of each of the nodes is increased.

An information acquisition device according to a first aspect of the present invention includes:

a light receiver with a two-dimensional light receiving surface;

a decoder, if a plurality of lights received by the two-dimensional light receiving surface are pieces of brightness-modulated information, the decoder decodes the received plurality of lights to the pieces of information; and an acquirer acquires position information of the information acquisition device in space from the pieces of information.

An information acquisition method according to a second aspect of the present invention includes:

a light receiving step in which a two-dimensional light receiving surface of a light receiving portion receives a plurality of lights;

an acquisition step of acquiring position information of the self in space from the pieces of information.

A recording medium according to a third aspect of the present invention stores a program, the program having a computer with a light receiving portion function as:

a light receiver configured to receive a plurality of lights by a two-dimensional light receiving surface of a light receiving portion thereof;

a decoder, if the plurality of lights received by the light receiver are pieces of brightness-modulated information, the decoder decodes the received plurality of lights to the pieces of information; and an acquirer acquires position information of a self in space from the pieces of information.

An information acquisition system includes information acquisition devices according to a fourth aspect of the present invention, each of the information acquisition devices including:

a light receiver with a two-dimensional light receiving surface;

a decoder, if information acquisition devices other than a self-information acquisition device emit a plurality of lights, the two-dimensional light receiving surface receives the plurality of lights, and the received plurality of lights are pieces of brightness-modulated information, the decoder decodes the received plurality of lights to the pieces of information;

an acquirer acquires position information of the self-information acquisition device in space from the pieces of information;

a light emitter; and a light emitting controller configured to subject the position information of the self-information acquisition device acquired by the acquirer to brightness modulation and to control the light emitter so as to emit the plurality of lights at the modulated brightness.

BRIEF DESCRIPTION OF THE DRAWINGS

A more complete understanding of this application can be obtained when the following detailed description is considered in conjunction with the following drawings, in which.

DETAILED DESCRIPTION

Hereinafter embodiments of the present invention will be described with reference to drawings.

Figure 1:
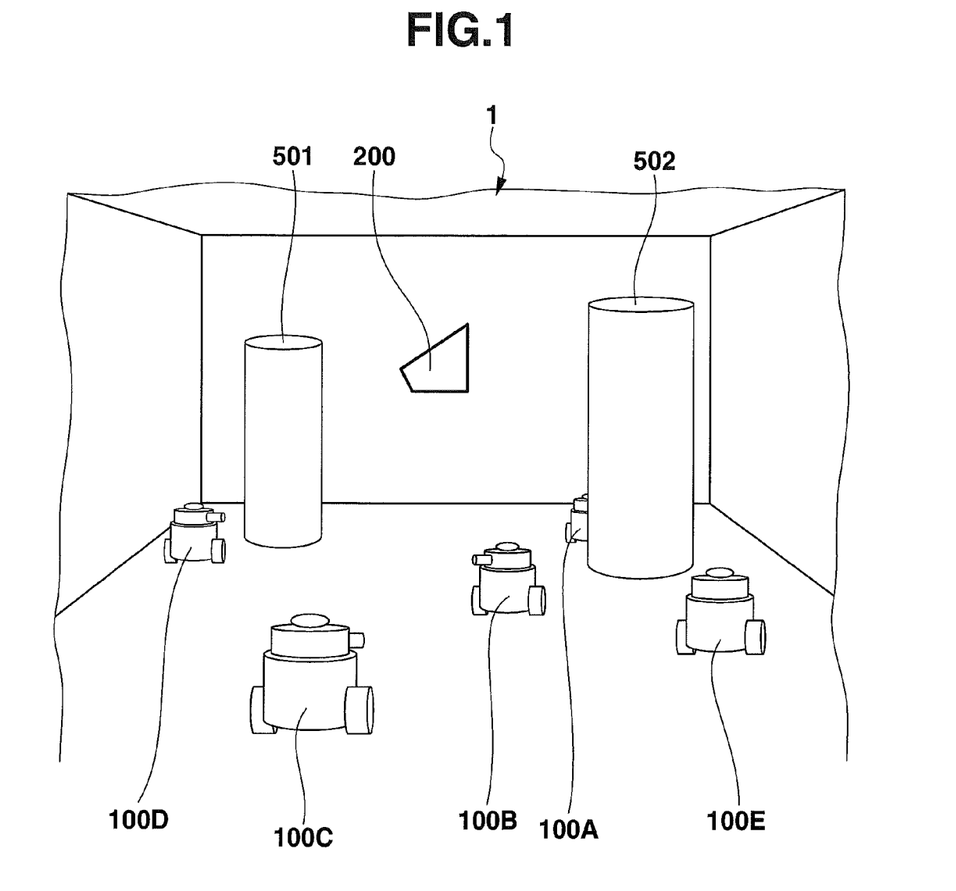
FIG. 1 is a perspective view illustrating one example of an arrangement of moving-objects and a reference light source that constitute an information acquisition system according to an embodiment of the present invention.
Figure 2:
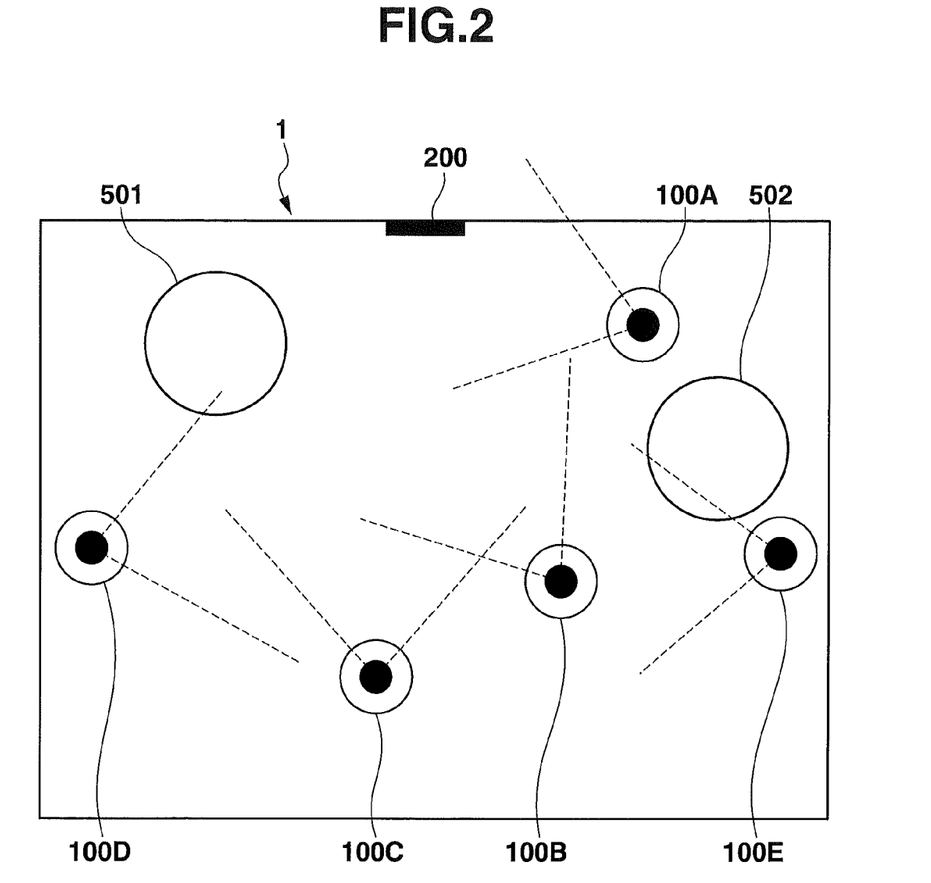
FIG. 2 is a top view illustrating moving-objects and a reference light source that constitute an information acquisition system according to the embodiment of the present invention.

As illustrated in FIGS. 1 and 2, an information acquisition system 1 includes: moving-object 100A, 100B, 100C, 100D and 100E (which are information acquisition devices and hereinafter will be called "moving-objects 100") that are in a workspace; and a reference light source 200 whose position and light surface shape are unchanged in the workspace where moving-objects 100 move. In this workspace are disposed posts 501 and 502 (obstacles).

Moving-objects 100 can move in the workspace, and, for example, shares cleaning of the workspace. Further, in an initial state where moving-objects 100 are disposed in the workspace, each moving-object 100 does not recognize an absolute position and absolute orientation of itself.

(An absolute position indicates a position of each moving-object 100 on a two-dimensional plane with the origin being a predetermined position in the workspace, and an absolute orientation indicates orientation of a central axis of a light receiving surface (that will be described later) in an imaging unit of each moving-object 100 on a two-dimensional plane with the origin being a predetermined position in the workspace.)

Each moving-object 100 has an image sensor communication function. While moving, each moving-object 100 receives, as needed, light emitted from the reference light source 200, as well as light that is emitted from other moving-objects 100 and modulated according to position information indicative of an absolute position of the other moving-objects 100, and sequentially takes an image of the light, decodes the image to information, thereby determining an absolute position of the moving-object 100 itself.

Each moving-object 100 emits light modulated according to position information indicative of an absolute position of itself, thereby helping another moving-object 100 that received the emitted light to determine an absolute position thereof.

A range between dot lines (straight lines) in FIG. 2 is an imaging field angle (that is, a light receiving range) of a camera mounted in each moving-object 100.

Next, detailed configuration of each moving-object 100 will be described.

Figure 3:
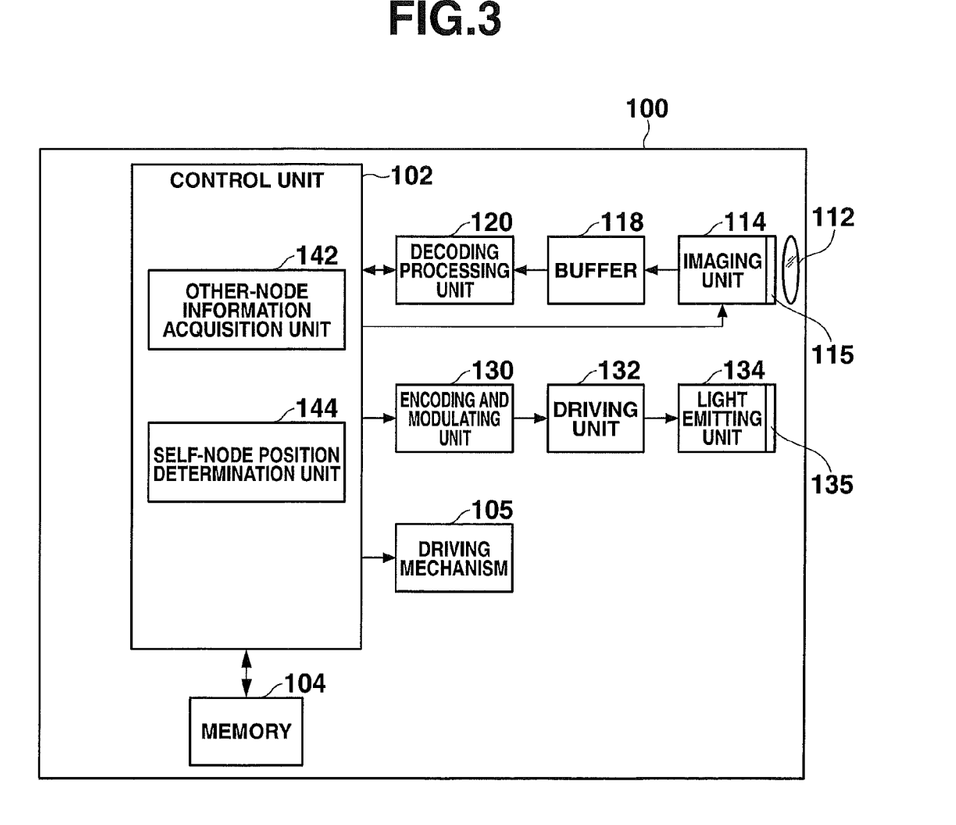
FIG. 3 is a diagram illustrating one example of a configuration of a moving-object according to the embodiment of the present invention.

As illustrated in FIG. 3, each moving-object 100 includes a control unit 102, a memory 104, a driving mechanism 105, a lens 112, an imaging unit 114, a buffer 118, a decoding processing unit 120, an encoding and modulating unit 130, a driving unit 132 and a light emitting unit 134.

The control unit 102 is constituted by, for example, a central processing unit (CPU).

The control unit 102 performs software processing according to a program (for example, a program for realizing operation of moving-object 100 illustrated in FIGS. 4 and 7, which will be described later) stored in the memory 104, thereby controlling various functions of moving-object 100.

The control unit 102 includes an other-node information acquisition unit 142 and a self-node position determination unit 144.

The memory 104 is, for example, a random access memory (RAM) and a read only memory (ROM).

The memory 104 stores various information (such as a program) to be used for, for example, control by moving-object 100.

The driving mechanism 105 includes a motor, a wheel and a steering mechanism for moving moving-object 100.

The driving mechanism 105 is driven by inputting a control signal based on driving control by the control unit 102, thereby moving moving-object 100.

The lens 112 is constituted by a zoom lens and a focus lens.

The lens 112 is operated by focusing control by the control unit 102, thereby controlling an imaging field angle at which the imaging unit 114 takes an image, and an optical image to be taken by the imaging unit 114.

The imaging unit 114 is constituted by light receiving elements that are regularly and two-dimensionally arranged on a light receiving surface 115.

The light receiving elements are imaging devices such as charge coupled devices (CCD) and complementary metal oxide semiconductors (CMOS).

The imaging unit 114 takes an optical image (receives light) incident through the lens 112 at an imaging field angle within a predetermined range on the basis of a control signal from the control unit 102, and converts an image signal within the imaging field angle to digital data to generate a frame.

The imaging unit 114 continuously performs imaging and frame generation, sequentially stores and updates consecutive frames in the buffer 118.

The control unit 102 determines whether there is a brightness change with time in the same pixel region of the frames sequentially imaged.

If a brightness in a pixel region is more than or equal to a first predetermined value in any one frame and is less than or equal to a second predetermined value in any different one frame, it is determined that a brightness of the pixel region has changed due to flashing of light of another moving-object 100 or the reference light source 200.

If the control unit 102 determines as described above, the control unit 102 stores or updates, information indicative of a position of an outer edge of this pixel region (hereinafter referred to as "a bright spot region") (bright spot region range information), and a bit data array generated in such a way that an aspect (light-on and light-off) of a brightness change with time over a predetermined number of frames in the bright spot region are represented by "1" and "0" respectively, in a coordinate data list in the buffer 118.

If there are more than one bright spot regions, the control unit 102 generates, for each of the bright spot regions, bright spot region range information and a bit data array.

The decoding processing unit 120 decodes, on the basis of a control signal from the control unit 102, the bit data array indicative of an aspect of a brightness change stored in the coordinate data list in the buffer 118 to digital data.

As a decoding method, a method corresponding to an encoding method of the encoding and modulating unit 130 in other moving-objects 100 and the reference light source 200 is adopted.

The encoding and modulating unit 130 encodes data outputted from the control unit 102 to a bit data array.

Further, the encoding and modulating unit 130 performs digital modulation based on the bit data array.

Any encoding method and modulation method can be adopted, but 4 pulse position modulation (PPM) using a subcarrier with a frequency of 28.8 (kHz) is preferably adopted as a modulation method.

The driving unit 132 responds to a signal outputted from the encoding and modulating unit 130 to generate a driving signal for changing a brightness of light emitted from the light emitting unit 134 with time.

A driving signal instructs to increase a brightness to more than or equal to the first predetermined value at a timing when a pulse exists corresponding to a bit "1", and instructs to decrease a brightness to less than or equal to the second predetermined value at a timing where a pulse does not exist corresponding to a bit "0" (provided, the second predetermined value<the first predetermined value).

The light emitting unit 134 emits light whose brightness changes with time to more than or equal to the first predetermined value and to less than or equal to the second predetermined value from a light emitting surface 135 according to a driving signal outputted from the driving unit 132. In the present embodiment, the light emitting surface 135 has a circular shape whose diameter is, for example, about 5 cm, which is much smaller than a light emitting surface of the reference light source 200.

Next, operation of moving-objects 100 will be described.

First, operation in transmitting information will be described.

Figures 4, 5:
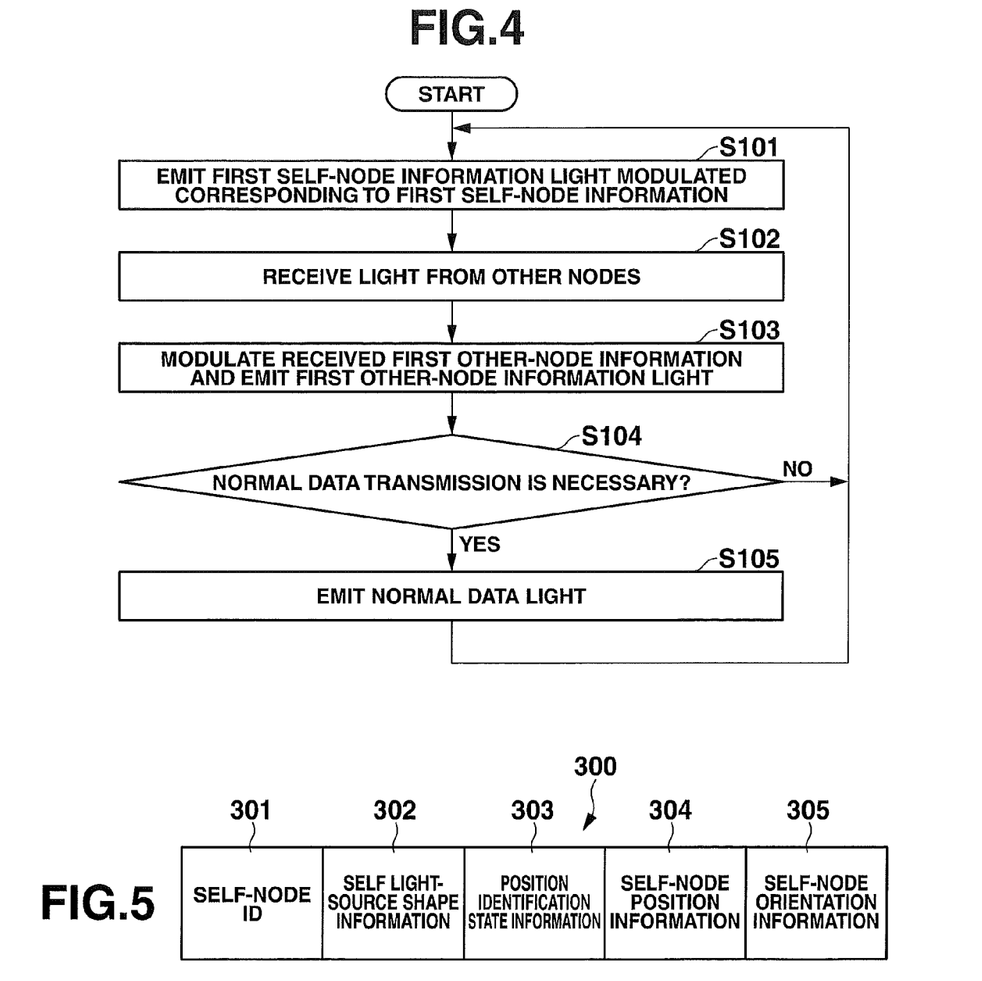
FIG. 4 is a flow chart illustrating operation of information transmission by a moving-object according to the embodiment of the present invention.
FIG. 5 is a diagram illustrating one example of self-node information transmitted by a moving-object according to the embodiment of the present invention.

As illustrated in FIG. 4, at Step S101, moving-object 100 emits a self-node information 300 (a first self-node information) light that is information on the moving-object 100 (self-node).

Specifically, at Step S101, the control unit 102 generates the first self-node information. As illustrated in FIG. 5, the above first self-node information 300 includes self-node ID 301, self-light-source shape information 302, position identification state information 303, self-node position information 304 and self-node orientation information 305.

The self-node ID 301 is identification information to identify a corresponding self-node moving-object 100 from other-node moving-objects 100.

The self-light-source shape information 302 is vector information indicative of a shape and size of the light emitting surface 135 of the light emitting unit 134 in the self-node moving-object 100.

The position identification state information 303 is information that indicates which of the following states the self-node moving-object 100 is in:

state in which a position is not identified (unidentified state)

state in which light from another moving-object 100 is received by the imaging unit 114, and a position of the self-node moving-object 100 relative to the moving-object 100 is identified by a light receiving position (a position of a pixel region having a predetermined brightness modulation) on the imaging surface (relative position identified state), or state in which a position of the self-node moving-object 100 in the workspace is identified (absolute position identified state).

The self-node position information 304 is information of an absolute position (coordinates) in the workspace in the above absolute position identified state.

(A method of identifying an absolute position in the workspace will be described later).

The self-node orientation information 305 is information indicative of an absolute orientation that is imaged (light-received) by the imaging unit 114 in the self-node moving-object 100, based on a center of a field angle of the imaging surface (light receiving surface) 115 in the above absolute position identified position.

The control unit 102 stores the first self-node information 300 in the memory 104.

The control unit 102 also outputs the first self-node information 300 to the encoding and modulating unit 130.

The encoding and modulating unit 130 encodes the first self-node information 300 outputted from the control unit 102 to a bit data array.

Further, the encoding and modulating unit 130 modulates the bit data array to a brightness modulation signal whose brightness changes with time and outputs the brightness modulation signal.

The driving unit 132 generates a driving signal according to the signal outputted from the encoding and modulating unit 130.

The light emitting unit 134 emits a first self-node information light corresponding to the first self-node information 300 from the light emitting surface 135 in response to the driving signal.

At Step S102, the self-node moving-object 100 receives light from another-node moving-object 100.

Specifically, the imaging unit 114 takes an optical image (receives light) incident through the lens 112 at an imaging field angle, converts an image signal within the imaging field angle to digital data to sequentially generate frames, sequentially stores and updates these frames in the buffer 118.

The control unit 102 determines whether there is a change with time in a brightness of the same pixel region in the frames sequentially imaged.

If a brightness of a pixel region is more than or equal to the first predetermined value in any one frame and is less than or equal to the second predetermined value in any different one frame, it is determined that a brightness of the pixel region has changed due to flashing of light of another moving-object 100 and the reference light source 200.

If it is determined as the above, the control unit 102 stores or updates, information indicative of a position of an outer edge of the pixel region (hereinafter, referred to as "a bright spot region") (bright spot region range information), as well as a bit data array generated in such a way that an aspect of a brightness change (light-on and light-off) with time in the bright spot region over a predetermined frames are represented by "1" and "0" respectively, in a coordinate data list in the buffer 118.

If there are more than one bright spot regions, the control unit 102 generates bright spot region range information and a bit data array for each of the bright spot regions.

The decoding processing unit 120 decodes a bit data array indicative of an aspect of a brightness change stored in the coordinate data list in the buffer 118 to digital data and outputs the digital data to the control unit 102.

At Step S103, the self-node moving-object 100 modulates first other-node information 400 of another-node moving-object 100 the self-node moving-object 100 has received, and emits the modulated information as a first other-node information light.

Specifically, the other-node information acquisition unit 142 in the control unit 102 determines whether digital data from the decoding processing unit 120 is second self-node information that is information on another-node moving-object 100.

For example, if digital data is digital data illustrated in FIG. 5 and a region of the self-node ID 301 in FIG. 5 contains ID of another-node moving-object 100, the other-node information acquisition unit 142 determines that this digital data is second self-node information 300.

If digital data is second self-node information 300, the other-node information acquisition unit 142 generates first other-node information 400 that is information on another-node moving-object 100.

Figure 6:
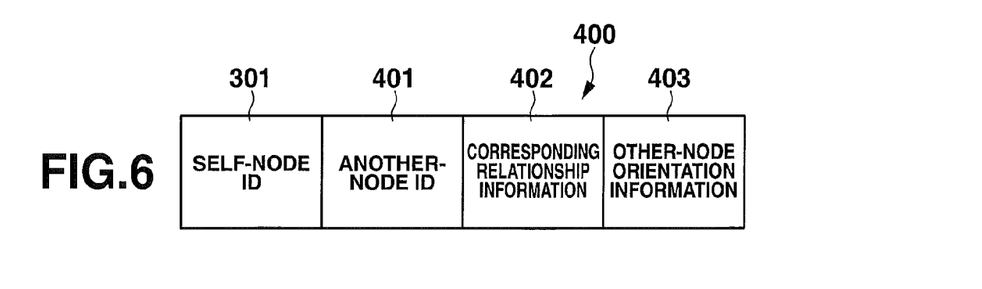
FIG. 6 is a diagram illustrating one example of other-node information transmitted by a moving-object according to the embodiment of the present invention.

As illustrated in FIG. 6, the first other-node information 400 is constituted by self-node ID 301, another-node ID 401, corresponding relationship information 402 between self-node and another-node and another-node orientation information 403.

Self-node ID 301 is identification information of the self-node moving-object 100.

Another node ID 401 is identification information of another-node moving-object 100.

As corresponding relationship information 402 between self-node and another-node, is stored information indicative of:

"absolute" if the self-node moving-object 100 is in the above absolute position identified state.

"relative" if the self-node moving-object 100 is the unidentified state or the relative position identified state.

Another-node orientation information 403, if the self-node moving-object 100 is in the above absolute position identified, indicates an absolute orientation of another-node moving-object 100 seen from a position of the self-node moving-object 100.

Another-node orientation information 403, if the self-node moving-object 100 is in the unidentified state or in the relative position identified state, indicates a relative orientation of another-node moving-object 100 seen from a position of the self-node moving-object 100, based on a field angle center of the imaging surface (light receiving surface) 115 of the self-node moving-object 100.

Next, the other-node information acquisition unit 142 outputs the generated first other-node information 400 to the encoding and modulating unit 130.

The encoding and modulating unit 130 encodes the first other-node information 400 outputted from the control unit 102 to a bit data array.

Further, the encoding and modulating unit 130 modulates the bit data array to a brightness modulation signal whose brightness changes with time and outputs the signal.

The driving unit 132 generates a driving signal according to the signal outputted from the encoding and modulating unit 130.

The light emitting unit 134 emits a first other-node information light corresponding to the first other-node information 400 from the light emitting surface 135, in response to the driving signal.

After that, at Step S104, the control unit 102 in the self-node moving-object 100 determines, for example, whether data for the moving-object 100 to realize a service has to be transmitted.

If the above data has to be transmitted, light modulated corresponding to normal data is emitted at Step S105.

A specific method is the same as the method at Step S101 and Step S103.

Figure 7:
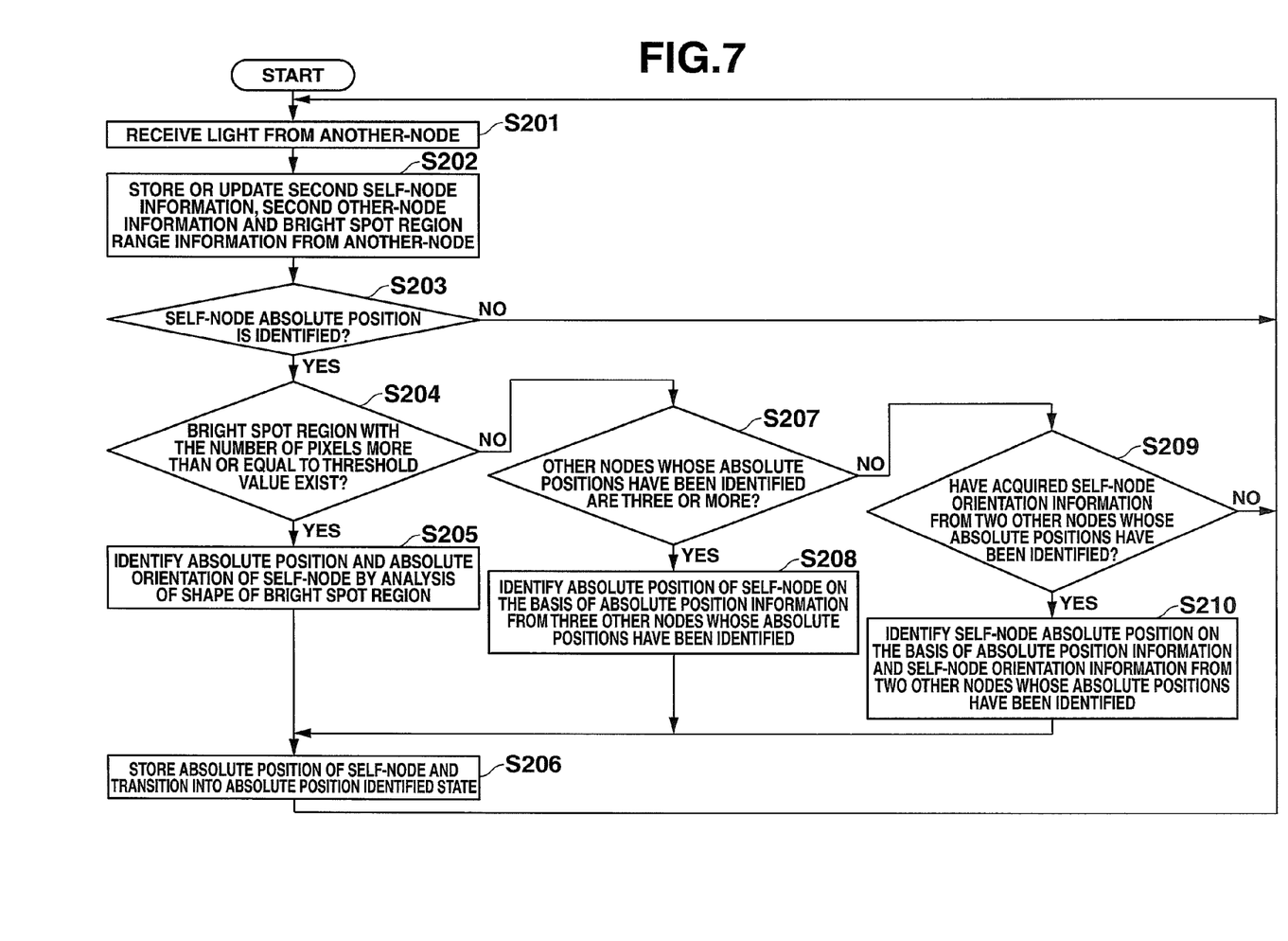
FIG. 7 is a flow chart illustrating operation of absolute position determination by a moving-object according to the embodiment of the present invention.

If position identification processing is performed by a self-node moving-object 100, the self-node moving-object 100 receives light from another moving-object 100 and the reference light source 200 at Step S201 as illustrated in FIG. 7.

Specifically, the imaging unit 114 takes an optical image (receives light) incident through the lens 112 at an imaging field angle within a predetermined range on the basis of a control signal from the control unit 102, and converts an image signal within the imaging field angle to digital data, thereby generating a frame.

The imaging unit 114 continuously performs imaging and frame generation, and sequentially stores and updates consecutive frames in the buffer 118.

The control unit 102 determines whether a brightness in the same pixel region changes with time for frames sequentially imaged.

If a brightness in a pixel region is more than or equal to the first predetermined value in any one frame and is less than or equal to the second predetermined value in any different one frame, it is determined that a brightness in the pixel region has changed due to flashing of light of another moving-object 100 or the reference light source 200.

If it is determined as the above, the control unit 102 stores or updates information indicative of a position of an outer edge of the pixel region (hereinafter will be referred to as "a bright spot region") (bright spot region range information) and a bit data array generated in such a way that an aspect of a brightness change (light-on and light-off) with time over a predetermined number of frames in the bright spot region are represented by "1" and "0" respectively in a coordinate data list in the buffer 118.

If there are more than one bright spot regions, the control unit 102 generates bright spot region range information and a bit data array for each of the bright spot regions.

At Step S202, the self-node moving-object 100 stores or updates second self-node information 300 that is information on another moving-object 100, which is a source of light received by the self-node moving-object 100 and second other-node information 400 that is information on itself (self-node) in association with bright spot region range information.

Specifically, the self-node position determination unit 144 in the control unit 102 determines whether digital data from the decoding processing unit 120 is second self-node information 300 that is information on another moving-object 100 (another-node).

For example, if the digital data has a structure illustrated in FIG. 5 and a region of self-node ID 301 in FIG. 5 contains ID other than ID of the self-node moving-object 100, the self-node position determination unit 144 determines that the digital data is second self-node information 300.

If the digital data is second self-node information 300, the self-node position determination unit 144 stores this second self-node information 300 and bright spot region range information corresponding thereto in the memory 104.

If the memory 104 already stores second self-node information 300 that contains self-node ID identical to self-node ID 301, the self-node position determination unit 144 updates second self-node information 300 and bright spot region range information.

The self-node position determination unit 144 determines whether digital data from the decoding processing unit 120 is second other-node information 400 that is information on moving-object 100 (self-node).

This determination method will be specifically described. In FIG. 6, if a region of self-node ID 301 contains ID other than ID of the self-node moving-object 100 and a region of other node ID 401 contains ID of the self-node moving-object 100, the self-node position determination unit 144 determines that this digital data is second other-node information 400.

If it is determined as above, the self-node position determination unit 144 stores bright spot region range information corresponding to second other-node information 400 in the memory 104.

If the memory 104 already stores second other-node information 400 containing self-node ID identical to self-node ID 301, the self-node position determination unit 144 updates second other-node information 400 and bright spot region range information.

At Step S203, the self-node moving-object 100 determines whether an absolute position thereof has been identified.

Specifically, if the memory 104 stores first self-node information 300, and position determination state information in the first self-node information indicates absolute position identified state, the self-node position determination unit 144 determines an absolute position of the self-node moving-object 100 has been identified. Otherwise, the self-node position determination unit 144 determines that an absolute position of the self-node moving-object 100 has not been identified.

The control unit 102 determines that an absolute position of the self-node moving-object 100 has been identified at Step S203 (Step S203; Yes), and determines, for a bright spot region corresponding to light received at Step S201, whether there is a bright spot region having the number of pixels more than or equal to a threshold value at Step S204.

Specifically, the self-node position determination unit 144 counts the number of pixels of the bright spot region on the basis of bright spot region range information stored in the memory 104, and determines whether the counted number of pixels is more than or equal to a threshold value.

If there are more than one bright spot regions in a frame, the self-node position determination unit 144 counts the number of pixels for each of the bright spot regions, and determines whether the number of pixels of the region is more than or equal to a threshold value.

At Step S204, if it is determined that there is a bright spot region having the number of pixels more than or equal to a threshold value (Step S204; Yes), the self-node moving-object 100 identifies an absolute position and absolute orientation thereof by analysis of a shape of the bright spot region at Step S205.

A specific determination method will not be described since it is disclosed in Unexamined Japanese Patent Application Kokai Publication No. 2005-115500 and Unexamined Japanese Patent Application Kokai Publication No. 2008-39494.

Figure 8A:
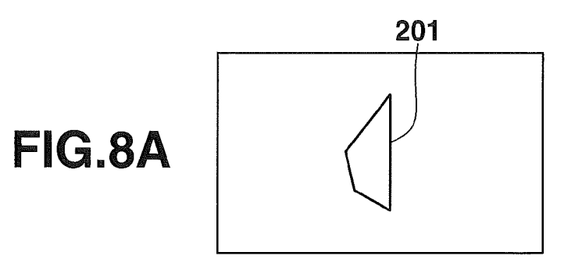
FIG. 8A is a diagram illustrating a first example of an image photographed by each moving-object according to the embodiment of the present invention.
Figure 8B:
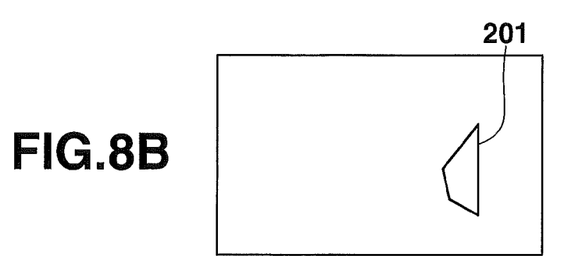
FIG. 8B is a diagram illustrating a second example of an image photographed by each moving-object according to the embodiment of the present invention.
Figure 8C:
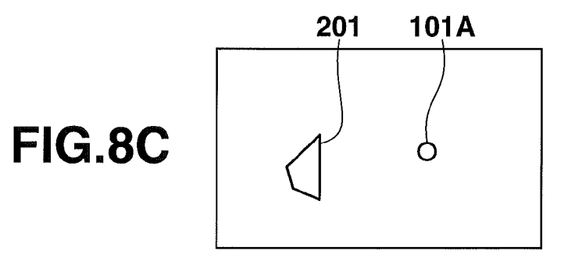
FIG. 8C is a diagram illustrating a third example of an image photographed by each moving-object according to the embodiment of the present invention.

For example, where moving-objects 100 are arranged as illustrated in FIG. 1 and FIG. 2, an image (frame) photographed by moving-object 100A is illustrated in FIG. 8A, an image (frame) photographed by moving-object 100B is illustrated in FIG. 8B, and an image (frame) photographed by moving-object 100C is illustrated in FIG. 8C. Each of the images contains a bright spot region 201 having a unique shape corresponding to light from the reference light source 200.

Therefore, the self-node position determination unit 144 in each of moving-object 100A, 100B, 100C analyzes a shape of the bright spot region 201 on the basis of bright spot region range information, thereby identifying an absolute position and absolute orientation of the self-node moving-object 100.

Meanwhile, if it is determined there is no bright spot region having the number of pixels as many as a threshold value at Step S204 (Step S204; No), the self-node moving-object 100 determines whether there are three or more other-node moving-objects 100 whose absolute positions have been identified at Step S207.

Specifically, the self-node position determination unit 144 determines whether there are three or more two pieces of second self-node information 300 whose position identification state information 303 indicates an absolute position identified state, of second self-node information 300 stored in the memory 104.

If there are three or more other moving-objects 100 (other nodes) whose absolute positions have been identified (Step S207; Yes), the self-node moving-object 100 identifies an absolute position thereof on the basis of absolute position information from three other moving-objects 100 whose absolute positions have been identified at Step S208.

Specifically, the self-node position determination unit 144 reads out self-node position information 304 contained in each of three pieces of second self-node information 300 stored in the memory 104.

The read-out self-node position information 304 indicates absolute positions of the other-node moving-objects 100. Hereinafter, the read-out self-node position information 304 will be referred to as absolute position information of the other-node moving-objects 100.

Next, the self-node position determination unit 144 reads out bright spot region range information contained in each of the read-out three pieces of second self-node information 300 from the memory 104.

Further, the self-node position determination unit 144 recognizes positions of bright spot regions in a frame, each corresponding to light from each of the three other moving-objects 100 on the basis of the bright spot region range information.

Figure 8D:
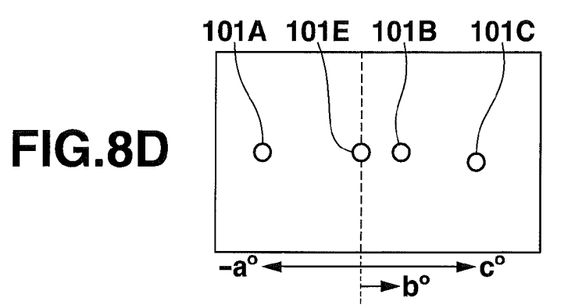
FIG. 8D is a diagram illustrating a fourth example of an image photographed by each moving-object according to the embodiment of the present invention.

For example, if the moving-objects 100 are arranged as illustrated in FIG. 1 and FIG. 2, an image (frame) photographed by moving-object 100D is illustrated in FIG. 8D.

In a frame photographed by moving-object 100D contain a bright spot region 101A corresponding to light from moving-object 100A, a bright spot region 101B corresponding to light from moving-object 100B, a bright spot region 101C corresponding to light from moving-object 100C, and a bright spot region 101E corresponding to light from moving-object 100E.

If a position of the bright spot region 101E is a reference position, an apparent angle of the bright spot region 101A is—a degrees, an apparent angle of the bright spot region 101B is b degrees, and an apparent angle of the bright spot region 101C is c degrees.

The above processing identifies absolute positions of the three other moving-objects 100 and apparent angles of the bright spot regions, each corresponding to light from each of the three other moving-objects 100. The self-node position determination unit 144 can determine an absolute position of the self-node moving-object 100 on the basis of the absolute positions of the three other moving-objects 100 and the apparent angles of the bright spot regions corresponding to light from the three other moving-objects 100.

For example, a case where the moving-objects 100 are arranged as illustrated in FIG. 1 and FIG. 2 and moving-object 100D determines an absolute position thereof will be described.

In this case, as described above, absolute positions of moving-object 100A and 100B have been identified and an apparent angle (a view angle) between moving-object 100A and moving-object 100B is (a+b) degrees.

Figure 9A:
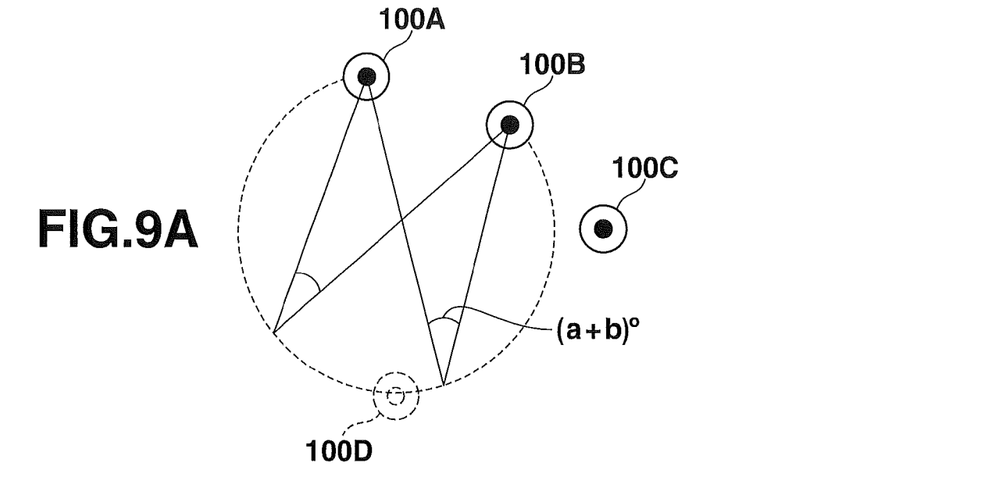
FIG. 9A is a diagram illustrating one example of a first procedure of position determination by a moving-object according to the embodiment of the present invention.

Accordingly, moving-object 100D exists on an arc represented by a dot line in FIG. 9A on the basis of the circumferential angle theorem.

As described above, the absolute positions of moving-objects 100B and 100C have been identified, and an apparent angle (a view angle) between moving-object 100B and moving-object 100C is (c−b) degrees.

Figure 9B:
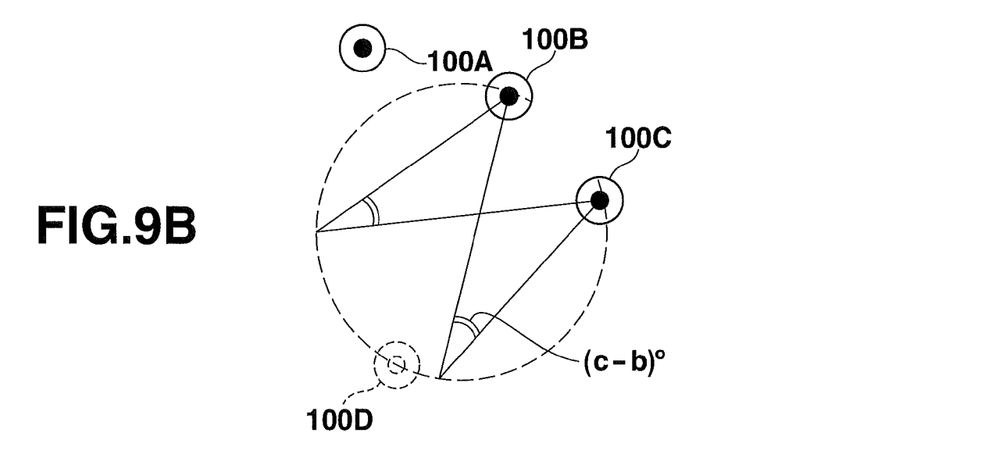
FIG. 9B is a diagram illustrating one example of a second procedure of position determination by a moving-object according to the embodiment of the present invention.

Accordingly, moving-object 100D exists on an arc represented by a dot line in FIG. 9B on the basis of the circumferential angle theorem.

Figure 9C:
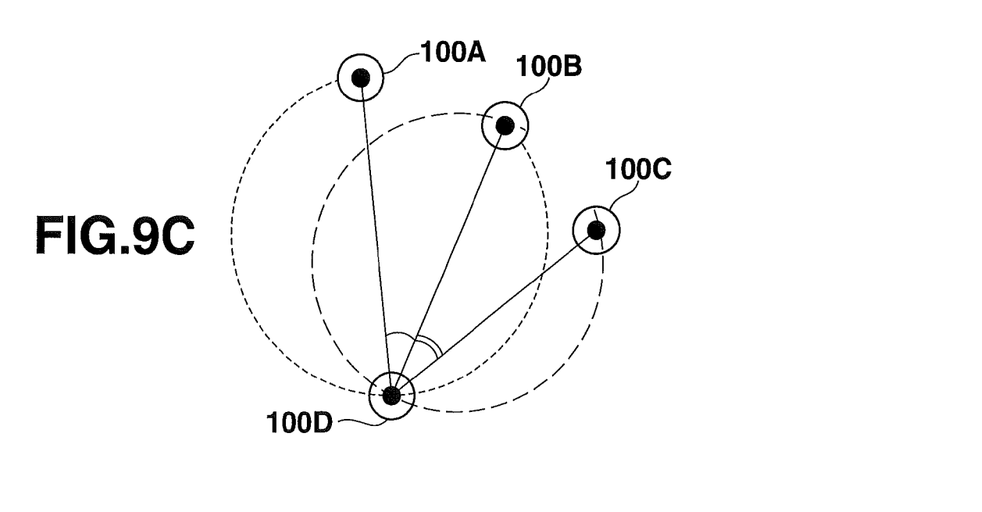
FIG. 9C is a diagram illustrating one example of a third procedure of position determination by a moving-object according to the embodiment of the present invention.

Therefore, an absolute position of moving-object 100D is an intersection of two arcs represented by the dot lines, as illustrated in FIG. 9C.

Meanwhile, if it is determined that three or more other-node moving-objects 100 whose absolute positions have been identified do not exist at Step S207 (Step S207; No), the self-node moving-object 100 determines whether to have acquired orientation information of the self-node moving-object 100 (other-node orientation information 403) from two other-node moving-objects 100 whose absolute positions have been identified at Step S209.

Specifically, the self-node position determination unit 144 determines whether memory 104 has stored two or more pieces of second other-node information 400 that contain "absolute" in corresponding relationship information 402.

If the memory 104 has two or more piece of second other-node information 400 that contain "absolute" in the corresponding relationship information 402, the self-node position determination unit 144 further determines whether these pieces of second other-node information 400 contain other-node orientation information 403.

If it is determined that orientation information of the self-node moving-object 100 has been acquired from two other-node moving-objects 100 whose absolute positions have been identified at Step S209 (Step S209; Yes), the self-node moving-object 100 reads out the absolute position information and other-node orientation information 403 from the two other-node moving-objects 100 whose absolute positions have been identified, and identifies an absolute position of the self-node moving-object 100 on the basis of the read-out information at Step S210.

Further, the self-node position determination unit 144 reads out self-node position information 304 in two pieces of second self-node information 300 that contain self-node ID identical to self-node ID 301 in the two pieces of second other-node information 400.

The read-out other-node orientation information 403 indicates absolute orientations from positions of the other-node moving-objects 100 to self-node moving-object 100, and the read-out self-node position information 304 indicates absolute positions of the other-node moving-objects 100.

Hereinafter, the read-out other-node orientation information 403 will be referred to as absolute orientation information of the self-node moving-object 100, and the read-out self-node position information 304 will be referred to as absolute position information of the other-node moving-objects 100.

Next, the self-node position determination unit 144 reads out bright spot region range information corresponding to each of two pieces of second self-node information 300 containing the read-out absolute position information from the memory 104.

Further, the self-node position determination unit 144 recognizes positions of bright spot regions in a frame corresponding to lights from the two other-node moving-objects 100 on the basis of the bright spot region range information.

Figure 10:
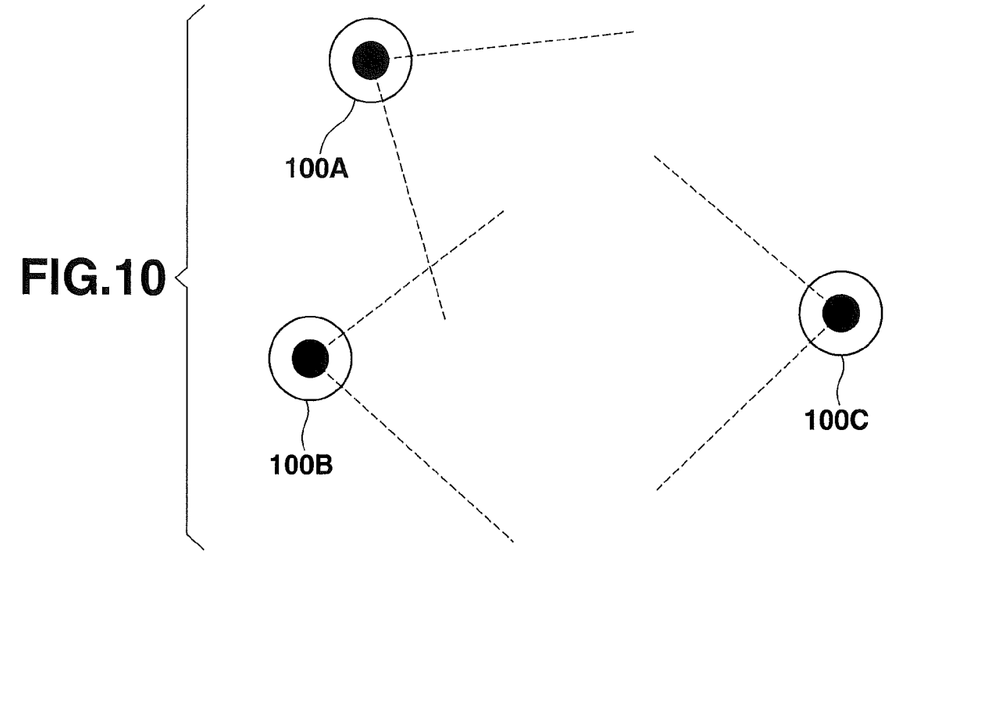
FIG. 10 is a diagram illustrating one example of arrangement of moving-objects according to the embodiment of the present invention.

Hereinafter, as a specific example, a case where the moving-objects 100 are arranged as illustrated in FIG. 10 and moving-object 100C identifies an absolute position thereof will be described.

Figure 11A:
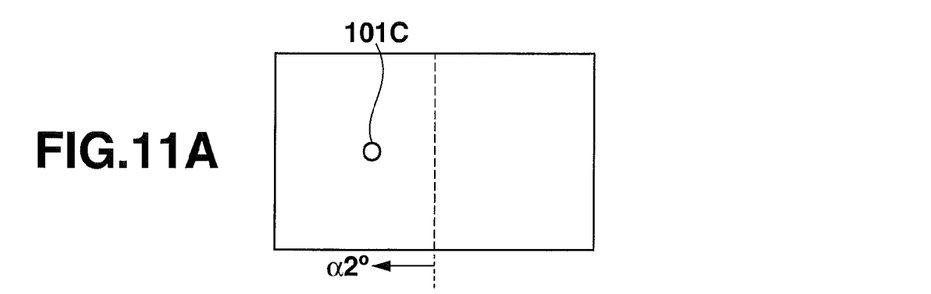
FIG. 11A is a diagram illustrating a sixth example of an image photographed by each moving-object according to the embodiment of the present invention.

In this case, a frame photographed by moving-object 100A is illustrated in FIG. 11A.

The frame photographed by moving-object 100A contains a bright spot region 101C corresponding to light from moving-object 100C.

Figure 12:
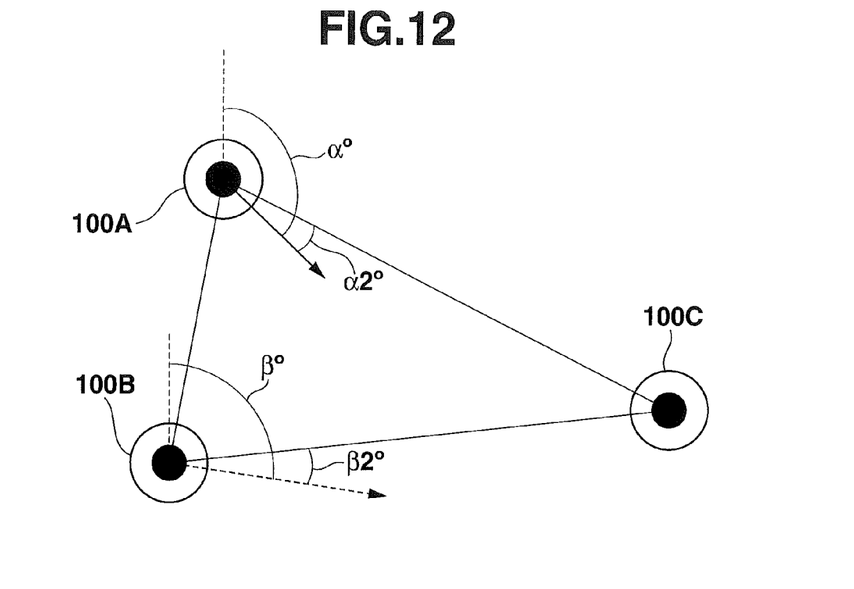
FIG. 12 is a diagram illustrating one example of a procedure of position determination by a moving-object according to the embodiment of the present invention.

Assuming that is a reference, an apparent angle of the bright spot region 101C is $-\alpha 2$ degrees, and an absolute orientation of a central axis of the light receiving surface 115 in the imaging unit 114 in moving-object 100A is $\alpha$ degrees as illustrated in FIG. 12, based on a central axis of the light receiving surface 115 in the imaging unit 114, an absolute orientation from a position of moving-object 100A to moving-object 100C is $\alpha-\alpha 2$ degrees.

This value is contained in other-node orientation information 403 in other-node information 400 from moving-object 100A to moving-object 100C.

Figure 11B:
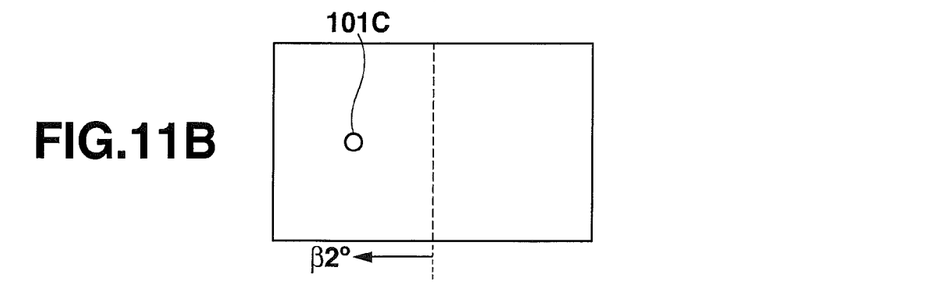
FIG. 11B is a diagram illustrating a seventh example of an image photographed by each moving-object according to the embodiment of the present invention.

An image (frame) photographed by moving-object 100B is illustrated in FIG. 11B.

The frame photographed by moving-object 100B contains a bright spot region 101C corresponding to light from moving-object 100C.

Assuming that an apparent angle of the bright spot region 101C is $-\beta 2$ degrees and an absolute orientation of a central axis of the light receiving surface 115 in the imaging unit 114 in moving-object 100B is $\beta$ degrees as illustrated in FIG. 12, based on a central axis of the light receiving surface 115 in the imaging unit 114, an absolute orientation from a position of moving-object 100B to moving-object 100C is $(\beta-\beta 2)$ degrees.

This value is contained in other-node orientation information 403 in other-node information 400 from moving-object 100B to moving-object 100C.

The above processing identifies absolute positions and absolute orientations of the two other-node moving-objects 100.

The self-node position determination unit 144 can identify an absolute position thereof on the basis of the absolute positions and absolute orientations of the two other-node moving-objects 100.

For example, as illustrated in FIG. 12, an intersection of a straight line drawn at an absolute orientation angle of $(\alpha-\alpha 2)$ degrees from an absolute position of moving-object 100A and a straight line drawn at an absolute orientation angle of $(\beta-\beta 2$ degrees) from an absolute position of moving-object 100B is an absolute position of moving-object 100C.

After an absolute position of the self-node moving-object 100 has been identified at Steps S205, S208 or S210, the self-node moving-object 100 stores information of an absolute position and absolute orientation thereof at Step S206.

Further, the self-node moving-object 100 changes a state thereof into an absolute position identified state.

Specifically, the self-node position determination unit 144 stores information of the identified absolute position of the self-node moving-object 100 in the memory 104.

If an absolute orientation has been identified at Step S205, the self-node position determination unit 144 also stores information of the identified absolute orientation of the self-node moving-object 100 in the memory 104.

The stored information of absolute position and absolute orientation of the self-node moving-object 100 and information indicative of absolute position identified state will be used later for generation of first self-node information 300 and first other-node information 400.

As described above, the information acquisition system 1 according to the present embodiment, each moving-object 100 in workspace receives light from three other-node moving-objects 100 to acquire information of absolute positions of the other-node moving-objects 100, thereby identifying an absolute position of itself.

Each moving-object 100, if no moving-object 100 has identified an absolute position thereof, receives light from the reference light source 200, thereby identifying an absolute position of itself.

Accordingly, a moving-object 100 receives light from the reference light source 200 to identify an absolute position thereof, and emits light modulated corresponding to information of the absolute position, enabling another moving-object 100 that cannot receive light from the reference light source 200 to identify an absolute position thereof, which increases the number of moving-objects 100 that have identified absolute positions of themselves as time passes.

Figure 13:
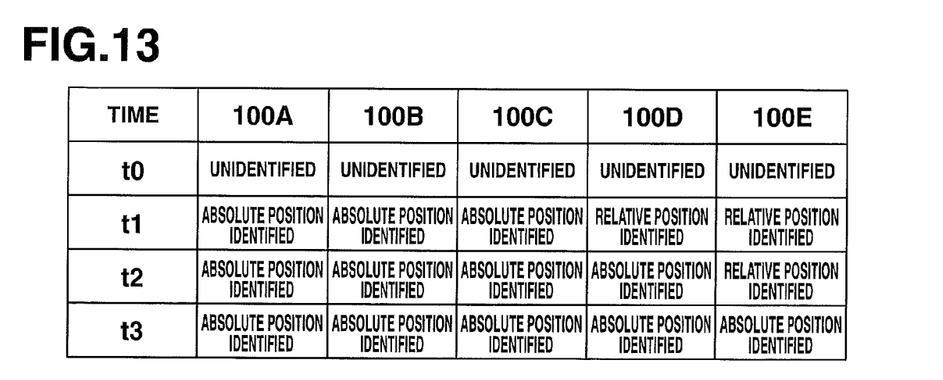
FIG. 13 is a table illustrating one example of time transition of position determination by each moving-object according to the embodiment of the present invention.

For example, an case where moving-objects 100 are arranged as illustrated in FIG. 1 and FIG. 2 and the number of moving-objects 100 that have identified absolute positions of themselves increases as time passes will be described. As illustrated in FIG. 13, at time t0, moving-objects 100A to 100E have not identified absolute positions of themselves.

Figure 8E:
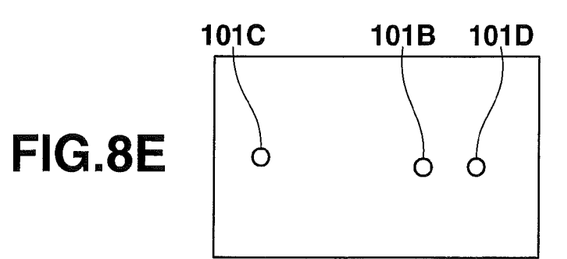
FIG. 8E is a diagram illustrating a fifth example of an image photographed by each moving-object according to the embodiment of the present invention.

After that, moving-objects 100A to 100E take photographs; a frame photographed by moving-object 100A is illustrated in FIG. 8A, a frame photographed by moving-object 100B is illustrated in FIG. 8B, a frame photographed by moving-object 100C is illustrated in FIG. 8C, a frame photographed by moving-object 100D is illustrated in FIG. 8D, and a frame photographed by moving-object 100E is illustrated in FIG. 8E.

Of these, each of the frames illustrated in FIGS. 8A to 8C contains a brightness region 201 corresponding to the reference light source 200. Therefore, moving-objects 100A, 100B and 100C can identify absolute positions of themselves at time t1, as illustrated in FIG. 13.

Meanwhile, at time t1, moving-object 100D only receives light from three moving-objects 100A, 100B and 100C whose absolute positions have been identified, and therefore can identify only a relative position of moving-object 100D, as illustrated in FIG. 8D.

At time t1, moving-object 100E receives only light from two moving-objects 100B and 100C whose absolute positions have been identified as illustrated in FIG. 8E, and therefore cannot identify an absolute position or a relative position of moving-object 100E.

After that, at time t2, moving-object 100D receives, from three moving-objects 100A, 100B and 100C whose absolute positions have been identified, light modulated corresponding to information of their absolute positions, and therefore can identify an absolute position of moving-object 100D.

Meanwhile, moving-object 100E is in a state immediately after the moving-object D receives, from two moving-objects 100B and 100C whose absolute positions have been identified, light modulated corresponding to information of these absolute positions and therefore identifies only a relative position of moving-object 100E.

At time t3, moving-object 100E can receive, from three moving-objects 100B, 100C and 100D whose absolute positions have been identified, light modulated corresponding to information of these absolute positions and therefore can identify an absolute position of moving-object 100E.

If one reference light source 200 is disposed in the workspace and at least three moving-objects 100 can identify their absolute positions on the basis of light from the reference light source 200 in this way, moving-objects 100 other than the at least three moving-objects 100 also can identify their absolute positions.

Accordingly, each moving-object 100, even if a reference light source does not exist within a visible range, can determine absolute position thereof and therefore can increase a certainty of position recognition.

In addition, in the information acquisition system 1 according to the present embodiment, a self-node moving-object 100 in the workspace receives light from two other-node moving-objects 100 to acquire information of absolute positions of the two other-node moving-objects 100 and information of absolute orientations from positions of the two other-node moving-objects to the self-node moving-object 100. This can identify an absolute position of the self-node moving-object 100.

For example, a case where moving-objects 100 are arranged as illustrated in FIG. 10 will be described.

Figure 14:
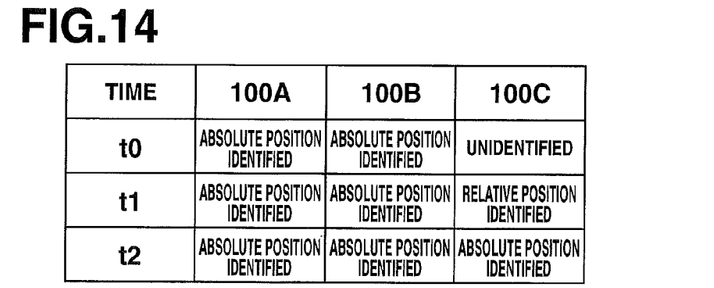
FIG. 14 is a table illustrating one example of time transition of position determination by each moving-object according to the embodiment of the present invention.

In this case, like the above, if absolute positions and absolute orientations of two moving-objects 100A and 100B have been identified as illustrated in FIG. 14, after that, another moving-object 100C can identify an absolute position thereof.

If at least two moving-objects 100 can identify absolute positions and absolute orientations of themselves in this way, another moving-object 100 can identify an absolute position of itself, which can increase a certainty of position recognition.

In the above embodiments, the reference light source 200 exists in the workspace, but this configuration is not essential. Without a reference light source in the workspace, when at least two moving-objects are introduced into the workspace, their absolute positions are recognized and if each moving-object moves after a predetermined time, the movement can update its absolute position.

In the above embodiments, a case where information acquisition devices are moving-objects 100 has been described, the present invention can be similarly applied to a different mobile body having a light source or a fixed device.

A device and a system that preliminarily includes a configuration for realizing a function according to the present invention can be provided, and also an existing apparatus can function as a device and a system according to the present invention by applying a program to the existing apparatus.

Any method to apply a program can be employed; for example, a program can be stored in a computer-readable recording medium such as a CD-ROM, a DVD-ROM and a memory card, or a program can be applied through a communication medium such as the Internet.

Having described and illustrated the principles of this application by reference to a preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An information acquisition device comprising:
   a light receiver with a two-dimensional light receiving surface;
   a decoder, if a plurality of lights received by the two-dimensional light receiving surface are pieces of brightness-modulated information, the decoder decodes the received plurality of lights to the pieces of information; and
   an acquirer acquires position information of the information acquisition device in space from the pieces of information.

2. The information acquisition device according to claim 1, further comprising a first determiner configured to determine whether the number of pieces of information decoded by the decoder is sufficient to identify a position of the information acquisition device, and
   if the first determiner determines affirmatively, the acquirer acquires the sufficient number of pieces of information, thereby acquiring position information of the information acquisition device in the space from these pieces of information.

3. The information acquisition device according to claim 1, wherein
   the pieces of information decoded by the decoder further contains pieces of orientation information indicative of orientations of the information acquisition device seen from positions of the light sources, and
   the acquirer acquires position information of the information acquisition device in the space from the pieces of information and the pieces of orientation information.

4. The information acquisition device according to claim 3, further comprising
   a second determiner configured to determine whether the number of pairs of the information and orientation information that were decoded by the decoder is sufficient to identify a position of the information acquisition device,
   if the second determiner determines affirmatively, the acquirer acquires the sufficient number of pairs of the information and orientation information to acquire position information of the information acquisition device in the space.

5. The information acquisition device according to claim 1, further comprising
   a light-receiving position acquirer configured to acquire light-receiving positions of the received plurality of lights from the light sources on the light receiving surface,
   wherein the acquirer acquires position information of the information acquisition device in the space from the light-receiving positions acquired by the light-receiving position acquirer, in addition to the pieces of information.

6. The information acquisition device according to claim 1 further comprising:
   a light emitter; and
   a light emitting controller configured to subject the position information of the information acquisition device acquired by the acquirer to brightness modulation and control the light emitter so as to emit a plurality of lights at the modulated brightness.

7. The information acquisition device according to claim 3 further comprising:
   a light emitter; and
   a light emitting controller configured to subject the position information of the information acquisition device and the pieces of orientation information that are acquired by the acquirer to brightness modulation and to control the light emitter so as to emit a plurality of lights at the modulated brightness.

8. An information acquisition method comprising:
   a light receiving step in which a two-dimensional light receiving surface of a light receiving portion receives a plurality of lights;
   if the plurality of lights received at the light receiving step are pieces of brightness-modulated information, a decoding step to decode the received plurality of lights to the pieces of information; and
   an acquisition step of acquiring position information of the self in space acquired from the pieces of information.

9. A recording medium having stored a program that can be read and executed by a computer with a light receiving portion, the program having the computer function as:
   a light receiver configured to receive a plurality of lights by a two-dimensional light receiving surface of a light receiving portion thereof;
   a decoder, if the plurality of lights received by the light receiver are pieces of brightness-modulated information, the decoder decodes the received plurality of lights to the pieces of information; and
   an acquirer acquires position information of a self in space from the pieces of information.

10. An information acquisition system comprising information acquisition devices, each of the information acquisition devices comprising:
    a light receiver with a two-dimensional light receiving surface;
    a decoder, if information acquisition devices other than a self-information acquisition device emit a plurality of lights, the two-dimensional light receiving surface receives the plurality of lights, and the received plurality of light are pieces of brightness-modulated information, the decoder decodes the received plurality of light to the pieces of information;
    an acquirer acquires position information of the self-information acquisition device in space from the pieces of information;
    a light emitter; and
    a light emitting controller configured to subject the position information of the self-information acquisition device acquired by the acquirer to brightness modulation and to control the light emitter so as to emit the plurality of lights at the modulated brightness.

* * * * *